United States Patent [19]
Pitman et al.

[11] Patent Number: 5,711,141
[45] Date of Patent: Jan. 27, 1998

[54] REVERSIBLE MOWER BLADE

[75] Inventors: Richard J. Pitman, Nashville; Paul L. Scott, Brentwood, both of Tenn.

[73] Assignee: Murray, Inc., Brentwood, Tenn.

[21] Appl. No.: 713,502

[22] Filed: Sep. 13, 1996

[51] Int. Cl.⁶ .................................................. A01D 34/73
[52] U.S. Cl. ......................... 56/255; 56/295; 56/DIG. 17
[58] Field of Search ......................... 56/255, 295, 17.5, 56/DIG. 17, DIG. 20

[56] References Cited

U.S. PATENT DOCUMENTS

| | | | |
|---|---|---|---|
| 3,683,606 | 8/1972 | Staines | 56/295 |
| 4,318,268 | 3/1982 | Szymanis | 56/295 X |
| 4,611,459 | 9/1986 | Cartner | 56/127 |
| 4,765,127 | 8/1988 | Hamblen | 56/295 |
| 5,284,006 | 2/1994 | Sheldon | 56/255 |

*Primary Examiner*—Terry Lee Melius
*Attorney, Agent, or Firm*—Cushman Darby & Cushman IP Group of Pillsbury Madison & Sutro LLP

[57] ABSTRACT

A reversible mower blade is formed from an elongated length of bar stock, the end portions of the blade including respective outer segments twisted in opposite senses about the longitudinal axis of the blade's central portion and respective inner segments also twisted in opposite senses about the axis. The inner and outer segment which form an end portion of the blade are twisted about the axis in opposite sense relative to one another.

8 Claims, 2 Drawing Sheets

REVERSIBLE MOWER BLADE

BACKGROUND OF THE INVENTION

1. Field of the Invention

The present invention relates to a blade for a rotary mower which cuts and mulches grass and which is reversible when its cutting edges become dull.

2. Prior Art

Conventional mower blades are provided with sharpened edges at their outer ends for cutting grass as the blades are rotated. Additionally, such blades have been provided with auxiliary elements which cause grass clippings produced during mowing to be cut into finer pieces so as to form mulch. After extensive use, however, the sharpened cutting edges become dull, and it is necessary to remove the blade and resharpen it in order to restore the blade to its optimum cutting capability.

The shortcoming of having to remove a mower blade and re-sharpen it due to dull cutting edges has been addressed previously. For example, U.S. Pat. No. 4,765,127, granted to Elic Hamblen on Aug. 28, 1988, discloses a mower blade which is sharpened at each end along both its leading and trailing edges. As the leading edges become dull, the mounting of the blade onto a rotatable drive shaft of the mower is reversed. As a result, what formerly were the leading edges of the blade become the trailing edges, and vice versa.

SUMMARY OF THE INVENTION

The present invention constitutes an improvement over the reversible mower blade disclosed in U.S. Pat. No. 4,765,127. More particularly, the outer ends of the mower blade are each formed with a pair of adjacent blade segments respectively twisted in opposite sense about a longitudinal axis of the blade to form planes inclined to that of the central portion of the blade. The blade segments are sharpened on both their leading bottom and trailing top edges. During operation, the blade's contour causes grass clippings to be circulated within the housing of the mower so as to direct them to the sharpened leading edges of the blade segments whereby the clippings are further cut into mulch. When the leading edges become dull, the blade is reversed on the mower's drive shaft so as to present new leading edges to the grass being cut.

BRIEF DESCRIPTION OF THE DRAWINGS

The invention will be described in greater detail with respect to the accompanying drawings of a preferred embodiment of the invention, wherein.

DETAILED DESCRIPTION OF A PREFERRED EMBODIMENT OF THE INVENTION

Figure 1:
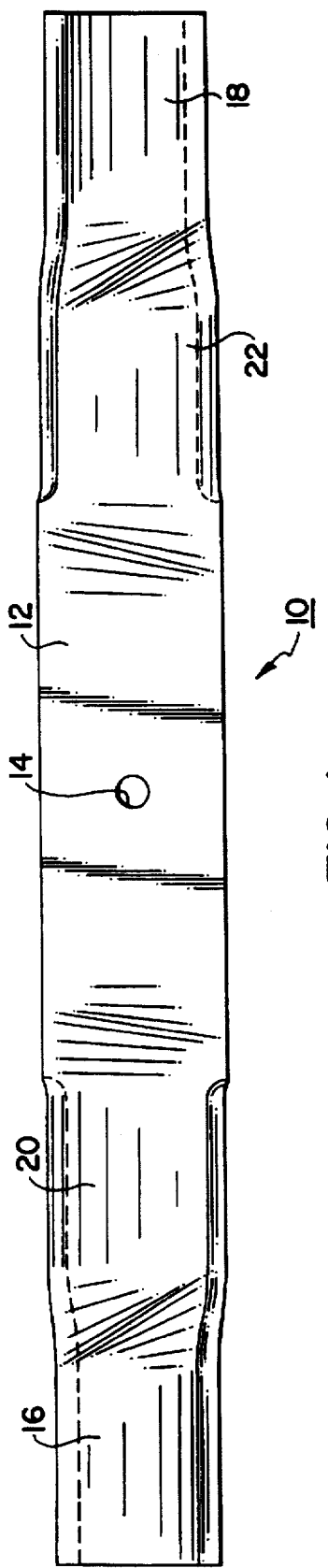
FIG. 1 is a top plan view of a mower blade.
Figure 2:
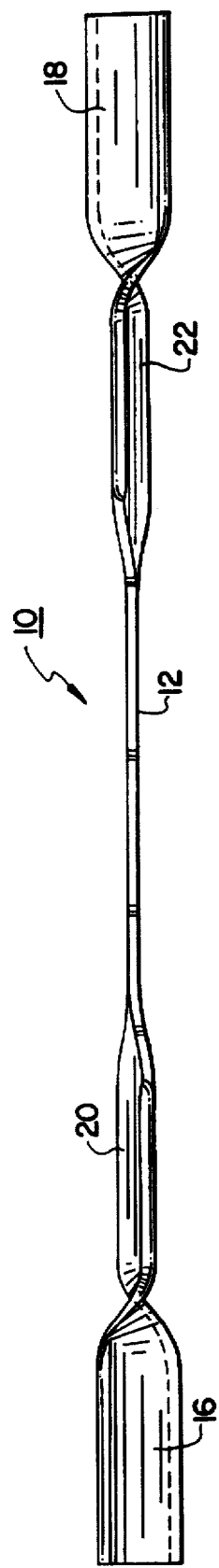
FIG. 2 is a side elevational view thereof.
Figure 3:
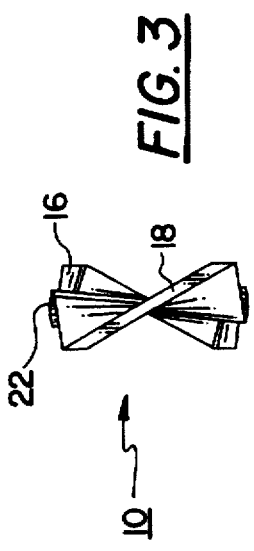
FIG. 3 is an end view thereof.

Referring to the drawings, a blade 10 comprises a piece of flat bar stock of rectangular cross-section having a sequence of twists provided at its outer ends. The blade includes a flat central portion 12 provided with an aperture 14 for receiving the drive shaft of a rotary mower (not shown) to which the blade is attached in a conventional manner. The blade 10 is further provided with correspondingly shaped twisted end segments 16 and 18 at the outer end portions of the blade. Segments 16 and 18 are formed at the outermost ends of the blades by twisting the blade ends approximately 15°–45° about the longitudinal axis of the blade. When viewed from the end of the blade containing segment 16, that segment is twisted counterclockwise relative to the blade's longitudinal axis, while segment 18 is twisted clockwise.

Additional segments 20 and 22 are located in coextensive integral relationship with respective segments 16 and 18 just inwardly thereof. However, each segment 20 and 22 is twisted in an opposite sense with respect to its adjacent segment. More particularly, when viewed from the end of the blade containing segment 16, the adjacent segment 20 is twisted approximately 2°–25° in a clockwise direction about the longitudinal axis of the blade, while segment 22 is twisted in a counterwise direction, also approximately 2°–25°.

Segments 16, 18, 20 and 22 are of similar length and form about two-thirds of the total length of the blade. The edges of the four segments are sharpened, as shown generally by 24 (FIG. 4), such that when the blade is mounted on the mower's drive shaft (not shown) so as to be rotated in a substantially horizontal plane by the mower's engine, the leading edges of segments 16 and 18 cut grass located in their paths.

As a result of being twisted in opposite senses about the blade's longitudinal axis, the main portions of segments 16 and 18 lie in inclined planes disposed approximately 15°–45° relative to the plane of blade's central portion 12. Similarly, the main portions of segments 20 and 22 lie in inclined planes of approximately 2°–25° relative to portion 12. Consequently, when the blade 10 is rotated within the confined space formed by a conventional mower housing (not shown), air within the housing is circulated relative to the blade as now will be described.

Figure 4:
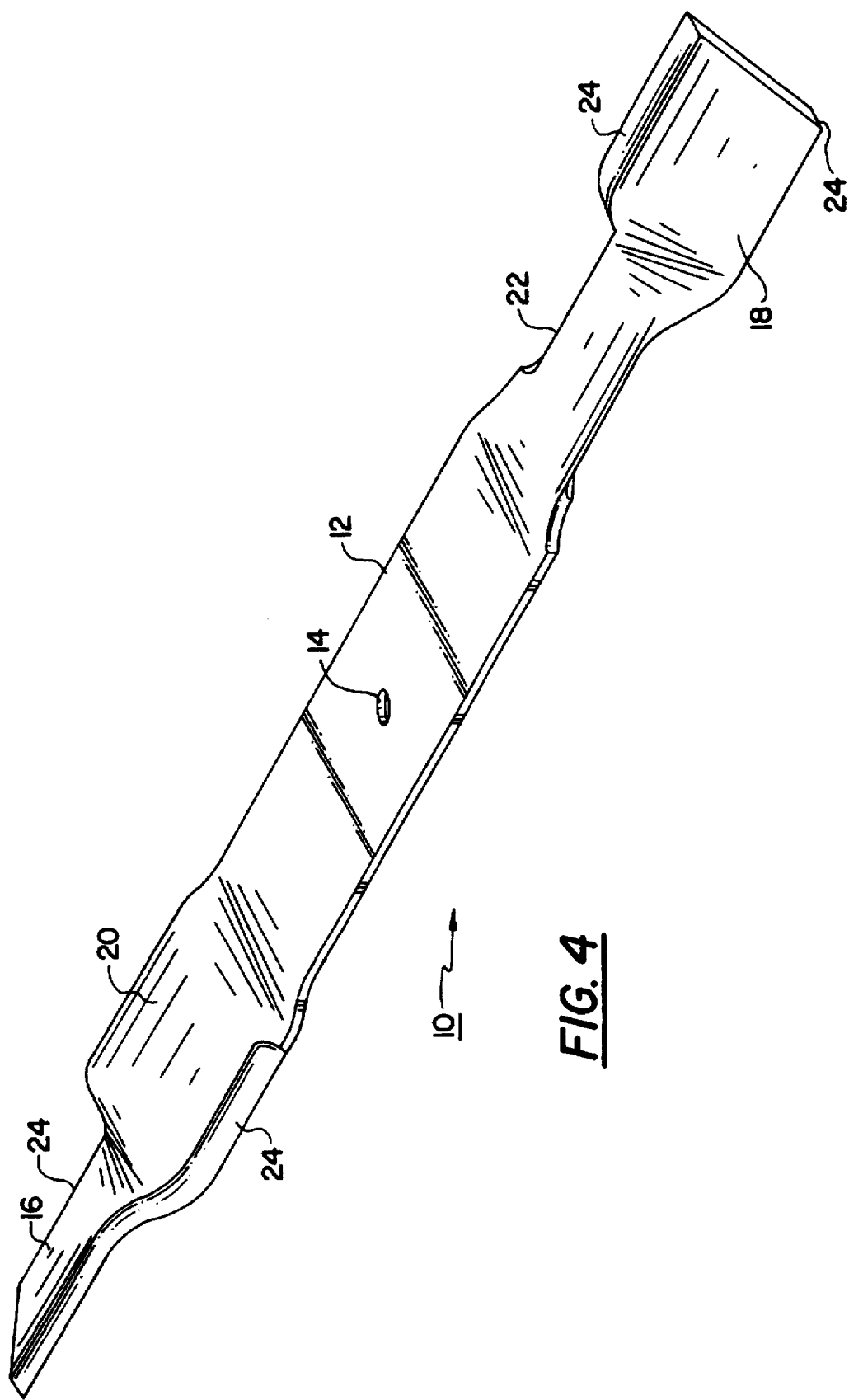
FIG. 4 is a perspective view thereof.

When the blade 10 is rotated in a clockwise direction about the axis of aperture 14 (as shown in FIGS. 1 and 4), segments 16 and 18 are inclined downwardly relative to the blade's central portion 12, while segments 20 and 22 are inclined upwardly. The blade's rotation causes the leading edges of segments 16 and 18 to cut the grass, and the clippings are lifted by segments 16 and 18. However, because the leading edges of segments 20 and 22 are above the plane of the blade's central portion 12, such rotation also results in segments 20 and 22 creating a downdraft. This draws the clippings into the paths of the sharpened leading edges of segments 20 and 22 thereby more finely cutting the clippings to produce a mulch in the form of grass particles which fall into the cut area to add nutrients to the soil.

Eventually, the leading edges of the blade will become dull. When this occurs, the symmetry of the blade permits the blade to be removed from the mower's drive shaft, inverted and re-secured to the shaft so as to function as a reversible mower blade. By such reversal, what previously were the trailing edges of the blade become the blade's sharpened leading edges. Of course, when they also become dull, the blade must be removed so that all edges can be sharpened. However, because the blade is reversible, the frequency of re-sharpening is reduced relative to the requirements of conventional non-reversible mower blades.

What is claimed is:

1. A reversible mower blade, comprising:
    an elongated central portion integrally joined at its opposite ends to respective end portions, said central and end portions being disposed along a common longitudinal axis and each end portion including an outer segment and a contiguous inner segment;
    said outer segments being twisted equally in opposite senses relative to the central portion about said longitudinal axis;

said inner segments being twisted equally in opposite senses relative to the central portion about said longitudinal axis, the inner segment of each end portion being twisted about the longitudinal axis in opposite sense to the twist of its respective outer segment; and said end portions including edge surfaces on opposite sides thereof extending towards the central portion, said edge surfaces being sharpened so as to form cutting edges on said opposite sides of each of the end portions.

2. A reversible mower blade according to claim 1, wherein said outer segments are twisted approximately 15°–45° about said longitudinal axis.

3. A reversible mower blade according to claim 1 or 2, wherein said inner segments are twisted approximately 2°–25° about said longitudinal axis.

4. A reversible mower blade according to claim 3, wherein said blade is formed from a single length of flat bar stock.

5. A reversible mower blade according to claim 1, wherein said segments are of substantially the same length and wherein the central portion has a length substantially the same as an end portion.

6. A reversible mower blade according to claim 5, wherein said outer segments are twisted approximately 15°–45° about said longitudinal axis.

7. A reversible mower blade according to claim 5 or 6, wherein said inner segments are twisted approximately 2°–25° about said longitudinal axis.

8. A reversible mower blade according to claim 7, wherein said blade is formed from a single length of flat bar stock.

* * * * *